United States Patent
Liggett et al.

(10) Patent No.: US 11,426,046 B2
(45) Date of Patent: Aug. 30, 2022

(54) OPTICAL INDICIUM FOR COMMUNICATING INFORMATION TO AUTONOMOUS DEVICES

(71) Applicant: SharkNinja Operating, LLC, Needham, MA (US)

(72) Inventors: Melinda L. Liggett, Watertown, MA (US); Adam Leech, Newton, MA (US); Catriona C. A. Sutter, Brookline, MA (US); Isaku D. Kamada, Brighton, MA (US)

(73) Assignee: SharkNinja Operating LLC, Needham, MA (US)

( * ) Notice: Subject to any disclaimer, the term of this patent is extended or adjusted under 35 U.S.C. 154(b) by 152 days.

(21) Appl. No.: 16/701,716

(22) Filed: Dec. 3, 2019

(65) Prior Publication Data

US 2020/0170470 A1  Jun. 4, 2020

Related U.S. Application Data

(60) Provisional application No. 62/774,599, filed on Dec. 3, 2018.

(51) Int. Cl.
  *A47L 9/28* (2006.01)
  *A47L 11/40* (2006.01)

(52) U.S. Cl.
  CPC .......... *A47L 9/2894* (2013.01); *A47L 9/2842* (2013.01); *A47L 9/2847* (2013.01); *A47L 9/2852* (2013.01);
  (Continued)

(58) Field of Classification Search
  CPC .............. A47L 11/4002; A47L 11/4011; A47L 2201/02; A47L 2201/04; A47L 2201/06;
  (Continued)

(56) References Cited

U.S. PATENT DOCUMENTS 5,525,883 A * 6/1996 Avitzour .............. G05D 1/0234
                                                318/587
6,362,875 B1   3/2002  Burkley
(Continued)

FOREIGN PATENT DOCUMENTS

| CN | 1314367 | 5/2007 |
|----|---------|--------|
| CN | 100579732 | 1/2010 |

(Continued)

OTHER PUBLICATIONS

H.R. Everett et al, "Modeling the Environment of a Mobile Security Robot", Naval Ocean Systems Center, Jun. 1990, pp. 1-158, Technical Document 1835, San Diego, California (ADA233074).
(Continued)

*Primary Examiner* — Marc Carlson
(74) *Attorney, Agent, or Firm* — Grossman Tucker Perreault & Pfleger, PLLC

(57) ABSTRACT

A beacon for a robotic cleaner may include a housing and an optical indicium having an optical pattern. The optical indicium may be coupled to the housing and be viewable by a camera of the robotic cleaner. After observing the optical indicium, the robotic cleaner may be caused to carry out an action associated with at least a portion of the optical pattern.

11 Claims, 4 Drawing Sheets

(52) U.S. Cl.
CPC ....... *A47L 11/4011* (2013.01); *A47L 2201/02* (2013.01); *A47L 2201/04* (2013.01); *A47L 2201/06* (2013.01)

(58) Field of Classification Search
CPC .... A47L 9/2842; A47L 9/2847; A47L 9/2852; A47L 9/2894; G05D 1/0225; G05D 1/0234; G05D 2201/0215
See application file for complete search history.

(56) References Cited

U.S. PATENT DOCUMENTS

| | | | |
|---|---|---|---|
| 6,496,754 | B2 | 12/2002 | Song et al. |
| 7,031,805 | B2 | 4/2006 | Lee et al. |
| 7,231,063 | B2 | 6/2007 | Naimark et al. |
| 7,333,631 | B2 | 2/2008 | Roh et al. |
| 7,340,076 | B2 | 3/2008 | Stach et al. |
| 7,689,001 | B2 | 3/2010 | Kim et al. |
| 7,765,027 | B2 | 7/2010 | Hong et al. |
| 7,933,687 | B2 | 4/2011 | Baek et al. |
| 8,972,052 | B2 * | 3/2015 | Chiappetta ........... G05D 1/0276 700/245 |
| 9,002,062 | B2 | 4/2015 | Aller |
| 9,180,596 | B2 | 11/2015 | Sim et al. |
| 9,227,323 | B1 | 1/2016 | Konolige et al. |
| 9,468,349 | B2 | 10/2016 | Fong et al. |
| 9,538,892 | B2 | 1/2017 | Fong et al. |
| 9,550,294 | B2 * | 1/2017 | Cohen ................... H02J 7/0045 |
| 9,682,481 | B2 | 6/2017 | Lutz et al. |
| 9,826,873 | B2 | 11/2017 | Abe et al. |
| 10,209,080 | B2 | 2/2019 | Lindhe et al. |
| 10,244,913 | B2 | 4/2019 | Schnittman et al. |
| 10,300,804 | B2 | 5/2019 | Salasoo |
| 10,314,452 | B2 | 6/2019 | Izawa et al. |
| 10,315,306 | B2 | 6/2019 | Abramson |
| 10,399,443 | B2 | 9/2019 | Kwa et al. |
| 10,423,163 | B2 | 9/2019 | Choi et al. |
| 10,466,710 | B2 | 11/2019 | Biber et al. |
| 10,698,411 | B1 * | 6/2020 | Ebrahimi Afrouzi ... B60L 53/30 |
| 2002/0120364 | A1 * | 8/2002 | Colens ................... B25J 9/1694 700/262 |
| 2005/0156562 | A1 * | 7/2005 | Cohen ................... A47L 9/2889 320/107 |
| 2005/0221840 | A1 * | 10/2005 | Yamamoto ........... G05D 1/0246 455/456.3 |
| 2006/0087273 | A1 * | 4/2006 | Ko ........................ A47L 9/2884 318/568.12 |
| 2006/0091899 | A1 * | 5/2006 | Akimichi ......... H03K 19/17764 326/10 |
| 2008/0161969 | A1 * | 7/2008 | Lee ....................... G05D 1/0225 700/245 |
| 2010/0215216 | A1 * | 8/2010 | Hong ................... G06K 9/3216 382/103 |
| 2010/0324736 | A1 * | 12/2010 | Yoo ...................... G05D 1/0234 700/259 |
| 2012/0259465 | A1 * | 10/2012 | Chen ..................... A47L 9/2805 901/1 |
| 2013/0261867 | A1 * | 10/2013 | Burnett ................ G05D 1/0272 701/23 |
| 2014/0115797 | A1 | 5/2014 | Duenne |
| 2015/0115876 | A1 * | 4/2015 | Noh ....................... H02J 7/0042 320/107 |
| 2015/0293533 | A1 * | 10/2015 | Ebrahimi Afrouzi ........................ G05D 1/0214 701/2 |
| 2016/0091899 | A1 * | 3/2016 | Aldred .................... B60L 1/003 701/23 |
| 2017/0177001 | A1 * | 6/2017 | Cao ........................ A47L 9/2805 |
| 2018/0004219 | A1 | 1/2018 | Aldred et al. |
| 2018/0246518 | A1 * | 8/2018 | Vogel ..................... B25J 9/0003 |
| 2019/0187717 | A1 * | 6/2019 | He .......................... A47L 9/2826 |
| 2019/0220033 | A1 * | 7/2019 | Cho ...................... G05D 1/0251 |
| 2020/0121148 | A1 * | 4/2020 | Hoffman ................ G01C 21/00 |

FOREIGN PATENT DOCUMENTS

| | | | | |
|---|---|---|---|---|
| CN | 207896709 | | 9/2018 | |
| CN | 108700880 | | 10/2018 | |
| CN | 208174318 | | 11/2018 | |
| CN | 209313458 | | 8/2019 | |
| CN | 111356393 | | 6/2020 | |
| DE | 102007036229 | A1 * | 2/2009 | ........... G05D 1/0225 |
| DE | 102012100324 | | 7/2013 | |
| EP | 1696298 | | 8/2006 | |
| EP | 1930797 | A2 * | 6/2008 | ........... G05D 1/0242 |
| EP | 2407074 | A2 * | 1/2012 | ........... A47L 9/2815 |
| EP | 3054361 | A1 * | 8/2016 | ........... B25J 19/005 |
| EP | 3308911 | | 4/2018 | |
| EP | 3400859 | 20 | 11/2018 | |
| JP | 2002323925 | | 11/2002 | |
| JP | 2016120168 | | 7/2016 | |
| JP | 2017104682 | | 6/2017 | |
| WO | 9504944 | | 2/1995 | |
| WO | 2019175992 | A1 | 9/2019 | |
| WO | 2019175993 | A1 | 9/2019 | |
| WO | 2019175994 | A1 | 9/2019 | |
| WO | 2019241262 | | 12/2019 | |
| WO | 2020019951 | A1 | 1/2020 | |
| WO | 2020137315 | | 7/2020 | |
| WO | 2020140809 | | 7/2020 | |

OTHER PUBLICATIONS

PCT Search Report and Written Opinion, dated Feb. 11, 2020, received in corresponding PCT Application No. PCT/US19/64179, 9 pgs.

Australian Office Action dated Jun. 30, 2021, received in Australian Patent Application No. 2019392447, 3 pages.

Canadian Office Action dated Jul. 19, 2021, received in Canadian Patent Application No. 3,122,028, 5 pages.

Chinese Office Action with English translation dated Oct. 21, 2021, received in Chinese Patent Application No. 201980090490.X, 14 pages.

Extended European Search Report dated Dec. 23, 2021, received in European Patent Application No. 19891712.2, 9 pages.

Japanese Office Action with English translation dated Dec. 22, 2021, received in Japanese Patent Application No. 2021-531666, 7 pages.

* cited by examiner

OPTICAL INDICIUM FOR COMMUNICATING INFORMATION TO AUTONOMOUS DEVICES

CROSS-REFERENCE TO RELATED APPLICATIONS

The present application claims the benefit of U.S. Provisional Application Ser. No. 62/774,599 filed on Dec. 3, 2018, entitled Optical Indicium for Communicating Information to Autonomous Devices, which is fully incorporated herein by reference.

TECHNICAL FIELD

The present disclosure is generally related to optical indicia for use with autonomous devices and more specifically related to optical indicia to communicate information to a robotic cleaner.

BACKGROUND INFORMATION

Robotic cleaners (e.g., robotic vacuum cleaners) are configured to autonomously clean a surface. For example, a user of a robotic vacuum cleaner may locate the robotic vacuum cleaner in an environment and instruct the robotic vacuum cleaner to commence a cleaning operation. While cleaning, the robotic vacuum cleaner collects debris and deposits it in a dust cup for later disposal by a user. The robotic vacuum cleaner may be configured to automatically dock with a docking station to recharge one or more batteries powering the robotic vacuum cleaner and/or to empty the dust cup.

A beacon may be positioned within the environment and be configured to generate an active signal (e.g., one or more infrared beams) to communicate with the robotic vacuum cleaner. For example, the docking station can function as a beacon and can be configured to emit an active signal into the environment. Based on the generated signal, the robotic vacuum cleaner can locate the docking station. Once the signal is detected, the robotic cleaner can be configured to follow the signal to the docking station.

BRIEF DESCRIPTION OF THE DRAWINGS

These and other features and advantages will be better understood by reading the following detailed description, taken together with the drawings, wherein.

DETAILED DESCRIPTION

The present disclosure is generally related to a beacon for a robotic cleaner. The beacon can include one or more optical indicia configured to communicate information to the robotic cleaner. The communicated information can be used to cause the robotic cleaner to carry out an action. For example, the communicated information can be used for localizing the robotic cleaner within an environment (e.g., to determine which room within a home the robotic cleaner is located within). In some instances, based on the determined portion of the environment, the robotic cleaner can select one or more predetermined cleaning profiles associated with the determined portion of the environment. Use of an optical indicium to communicate information to a robotic cleaner may reduce an amount of power consumed to communicate the information when compared to, for example, communication based on generation of a signal (e.g., an optical or radio signal).

Figure 1:
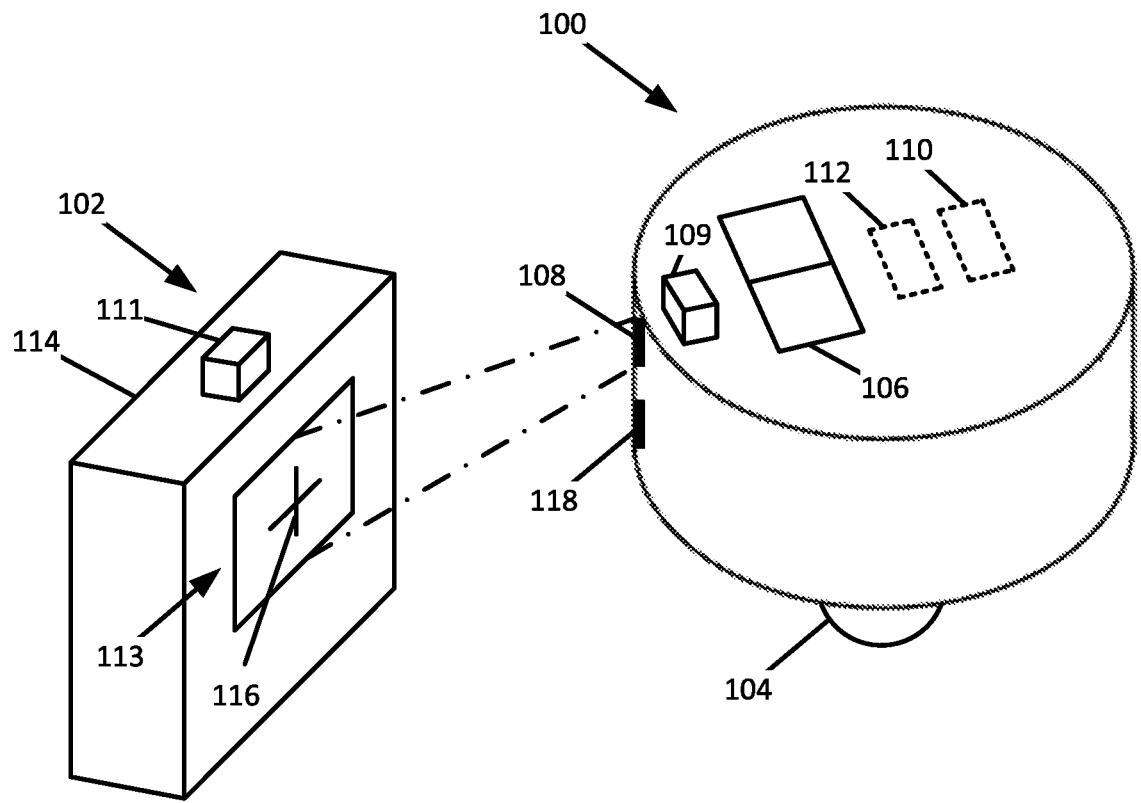
FIG. 1 is a schematic perspective view of a robotic cleaner and a beacon having an optical indicium coupled thereto, consistent with embodiments of the present disclosure.

FIG. 1 shows a schematic example of a robotic cleaner 100 (e.g., a robotic vacuum cleaner) and a beacon 102. The robotic cleaner 100 can include one or more driven wheels 104 configured to urge the robotic cleaner 100 across a surface to be cleaned (e.g., a floor), a control panel 106, at least one camera 108 (e.g., a monocular or stereo camera oriented in a forward, downward, or upward direction), at least one memory 110 (shown in hidden lines), and at least one processor 112 (shown in hidden lines) to execute one or more instructions stored in the memory 110 and cause the robotic cleaner 100 to carry out one or more actions based on the stored instructions. The robotic cleaner 100 can be configured, for example, to carry out one or more cleaning profiles stored in the memory 110. In some instances, the selected cleaning profile may be based, at least in part, on a location of the robotic cleaner 100.

The camera 108 can be configured to observe an environment within which the robotic cleaner 100 is located. For example, the camera 108 may be used to localize the robotic cleaner 100 within the environment such that the robotic cleaner 100 can navigate through the environment using one or more maps stored in the memory 110. In some instances, the camera 108 can be used to localize the robotic cleaner 100 by capturing an image of an optical indicium 113 coupled to a housing 114 of the beacon 102 and/or a portion of the environment (e.g., a wall, a ceiling, a floor, and/or the like). In other words, the optical indicium 113 is coupled to the housing 114 and/or coupled to a portion of the environment such that it is viewable by the camera 108. For example, the robotic cleaner 100 may be caused to load a map corresponding to a region where the optical indicium 113 and/or beacon 102 is located. In some instances, the location of the optical indicium 113 and/or beacon 102 may be indicated on the loaded map such that the robotic cleaner 100 can localize itself relative to the optical indicium 113 and/or beacon 102 within the loaded map.

In some instances, the beacon 102 can include a homing signal generator 111. The homing signal generator 111 is configured to generate a homing signal that is detectable by a homing signal detector 109 coupled to the robotic cleaner 100. Detection of the generated homing signal by the homing signal detector 109 can indicate that the robotic cleaner 100 is proximate the beacon 102. As such, when the homing signal is detected, the robotic cleaner 100 can be caused to search for the beacon 102. In some instances, the homing signal can be used to guide the robotic cleaner 100 towards the beacon 102 such that the camera 108 can capture an image of the optical indicium 113. For example, the homing signal detector 109 can be configured to measure an intensity of the detected homing signal such that the robotic cleaner 100 travels in a direction that results in the intensity of the homing signal increasing. The homing signal can be an optical signal (e.g., an infrared signal), an acoustic signal (e.g., an ultrasonic signal), a radio frequency signal, and/or any other type of signal. In some instances, the camera 108 can be used to detect the homing signal (e.g., when the homing signal is an infrared signal). In these instances, the robotic cleaner 100 may not include the homing signal detector 109.

The optical indicium 113 can include one or more optical patterns 116. Each optical pattern 116 can be configured to communicate information to the robotic cleaner 100. For example, the robotic cleaner 100 can capture an image of the optical indicium 113, identify the optical pattern 116, and compare the identified optical pattern 116 to known optical patterns stored in the memory 110 of the robotic cleaner 100. If the comparison indicates that the identified optical pattern 116 corresponds to a known optical pattern, the robotic cleaner 100 can determine an action associated with the optical pattern 116. After identifying the action associated with the optical pattern 116, the robotic cleaner 100 can be caused to carry out the identified action. If the comparison indicates that the identified optical pattern 116 does not correspond to a known optical pattern, the robotic cleaner 100 may associate an action with the optical pattern 116. An action may include one or more of a cleaning action (e.g., changing a suction power and/or brush roll rotation speed based, at least in part, on a surface type or room type), a navigation action (e.g., approach or avoid an area), a map loading action that causes a map associated with the optical pattern 116 to be loaded (e.g., a map corresponding to a location in which the beacon 102 and/or optical indicium 113 is disposed such as, for example, a specific floor or room of a home), associating a current map with the optical pattern 116 (e.g., if the optical pattern 116 is not recognized), and/or any other action.

In some instances, the optical indicium 113 can be a substrate having a corresponding optical pattern 116 on opposing sides of the substrate. In these instances, the optical pattern 116 corresponding to each side of the substrate can be associated with different actions. Additionally, or alternatively, the optical indicium 113 can be configured to have a plurality of orientations relative to the beacon 102. For example, the optical indicium 113 can be configured such that it can be rotated (e.g., clockwise or counter-clockwise) such that the orientation of the one or more optical patterns 116 changes. As such, the robotic cleaner 100 can be configured to associate different actions with each orientation of the one or more optical patterns 116. Additionally, or alternatively, the optical indicium 113 may be replaceable by a user of the robotic cleaner 100.

In some instances, the optical indicium 113 can be configured to be at least partially reflective such that, when illuminated, the optical pattern 116 is more visible to the camera 108 of the robotic cleaner 100. For example, the robotic cleaner 100 can include an illuminator 118 configured to emit light (e.g., infrared light) that illuminates at least a portion of the optical indicium 113. In some instances, the optical indicium 113 may be disposed within the housing 114 of the beacon 102 and behind a window in the housing 114, the window being transparent to one or more wavelengths of light such that optical indicium 113 is viewable by the camera 108. As such, the window can include one or more light transmissive materials such that one or more wavelengths of light can pass therethrough. In some instances, the window can be configured to substantially prevent light having a wavelength outside of a predetermined wavelength range from passing therethrough (e.g., less than 35%, less than 25%, less than 15%, less than 10%, less than 5%, or less than 1% of light passing through the window is outside of the predetermined wavelength range). For example, the window can be configured to allow substantially only infrared light to pass therethrough (e.g., at least 65%, at least 75%, at least 85%, at least 90%, at least 95%, or at least 99% of the light passing therethrough is infrared light). Such a configuration may allow the optical indicium 113 to be viewable by the camera 108 while remaining hidden from a user of the robotic cleaner 100.

The optical indicium 113 may have any shape. In some instances, the shape of the optical indicium 113 may be rotationally symmetric. In some instances, the optical indicium 113 may be circular, triangular, octagonal, square, pentagonal, and/or any other shape.

Figure 2:
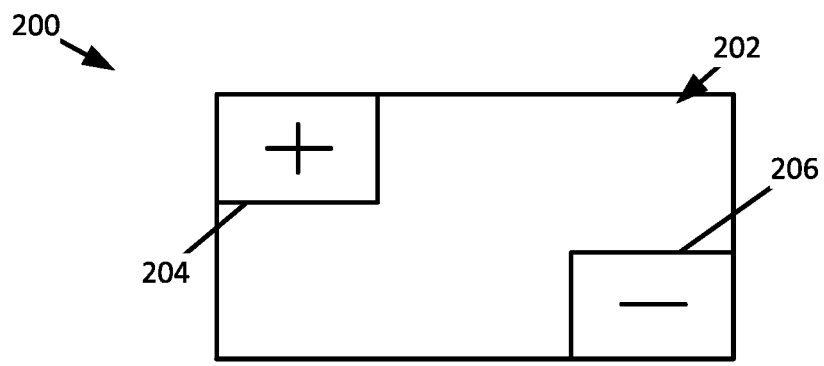
FIG. 2 is a schematic example of an optical indicium, consistent with embodiments of the present disclosure.

FIG. 2 shows a schematic example of an optical indicium 200, which may be an example of the optical indicium 113 of FIG. 1. As shown, the optical indicium 200 can include an optical pattern 202 having an identifying portion 204 and at least one action portion 206. The identifying portion 204 can identify an action type corresponding to a respective action portion 206. The action type can indicate which type of action the robotic cleaner 100 is to take (e.g., loading of a map, performing a cleaning action, performing a navigation action, and/or the like). The action portion 206 can indicate a specific action (e.g., load a specific map associated with the action portion 206, perform a specific cleaning action associated with the action portion 206, performing a specific navigation action associated with the action portion 206, and/or any other action).

As such, the identifying portion 204 of the optical pattern 202 can be compared to an identifying portion database to identify the action type. Upon identifying the action type, the action portion 206 can be compared to an action portion database associated with the identified action type. If the action portion 206 corresponds to a known action portion stored in the database, the robotic cleaner 100 can be caused to carry out the action associated with the known action portion. In other words, in response to identifying the action type for a known action portion, the robotic cleaner 100 can be caused to identify a corresponding action and carry out the corresponding action. If the action portion 206 does not correspond to a known action portion stored in the database, the robotic cleaner 100 may associate the action portion 206 with an action (e.g., associate the action portion with loading of a map associated with the current area, a cleaning action associated with a user input, a navigation action associated with a user input, and/or any other action) such that, when the action portion 206 is subsequently detected, the robotic cleaner 100 carries out the action associated with the action portion 206.

In some instances, the identifying portion 204 may indicate multiple action types, each corresponding to a respective action portion 206. As such, a single optical pattern 202 can cause the robotic cleaner 100 to carry out multiple different actions. In some instances, two or more corners of the optical indicium 200 may be occupied by a corresponding action portion 206. For example, the optical pattern 202 may include a first, second, and third action portion, wherein the first action portion corresponds to a cleaning action, the second action portion corresponds to a navigation action, and the third action portion corresponds to a map loading action. As such, the identifying portion 204 may identify a corresponding action type for each action portion 206 such that databases corresponding to each action portion 206 of the optical pattern 202 can be searched for a corresponding action.

In an instance where at least one of the action portions 206 causes the robotic cleaner 100 to load a specific map and at least one other action portion 206 causes the robotic cleaner 100 to engage in a specific navigation or cleaning action, the navigation or cleaning action may be specific to the loaded map. For example, the navigation action may identify locations on the loaded map in which the robotic cleaner 100 is not to travel. Additionally, or alternatively, a cleaning action may indicate portions of the loaded map in which the robotic cleaner 100 is to alter its cleaning behavior (e.g., increase/decrease suction power, disable a brush roll or side brush, and/or any other behavior). In some instances, one or more of the cleaning and/or navigation actions may be automatically updated by the robotic cleaner 100 based on sensory input. For example, in areas where the robotic cleaner 100 detects decreased debris collection, the robotic cleaner 100 may determine that the suction power can be reduced in these areas in order to reduce power consumption. Additionally, or alternatively, the cleaning and/or navigation actions may be adjusted in response to user inputs. For example, the user may indicate areas where increased/decreased suction is desired and/or areas which the robotic cleaner 100 is to avoid.

The optical indicium 200 may be a fixed medium (e.g., an adhesive label) configured to be coupled to a surface (e.g., a wall or the beacon 102). The fixed medium may include multiple sides, each side having one or more optical patterns 202. In other instances, the optical indicium 200 may be a dynamic medium (e.g., a display such as an electronic paper display or a liquid crystal display). In some instances, the optical pattern 202 may be a barcode such as a QR Code, an AR Tag, an APRIL Tag, a CAL Tag, and/or any other barcode. While the optical indicium 200 is shown as having a rectangular shape, the optical indicium 200 may have other shapes. For example, the optical indicium 200 may be circular, triangular, octagonal, square, pentagonal, and/or any other shape.

Figure 3:
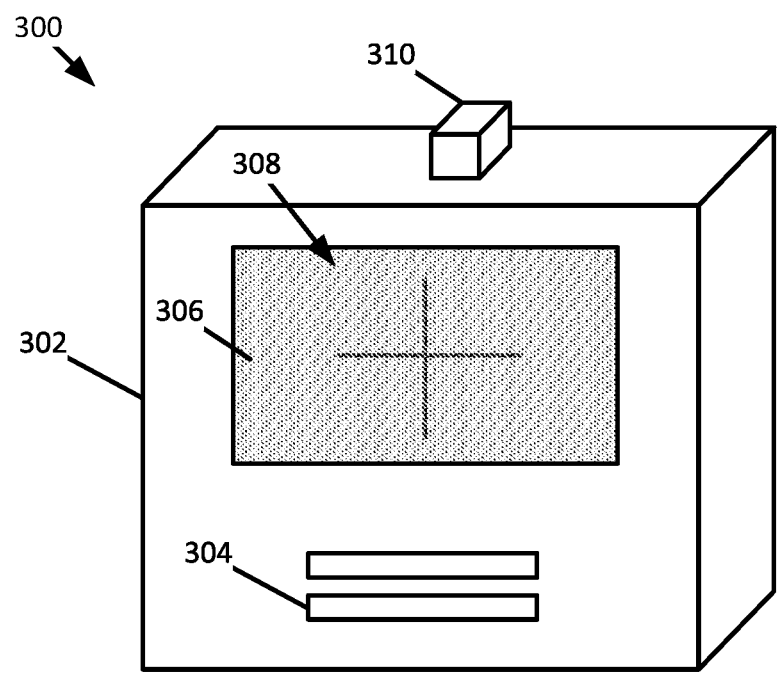
FIG. 3 is a schematic perspective view of the robotic cleaner of FIG. 1 and a docking station, which may be an example of the beacon of FIG. 1, consistent with embodiments of the present disclosure.
Figure 3:
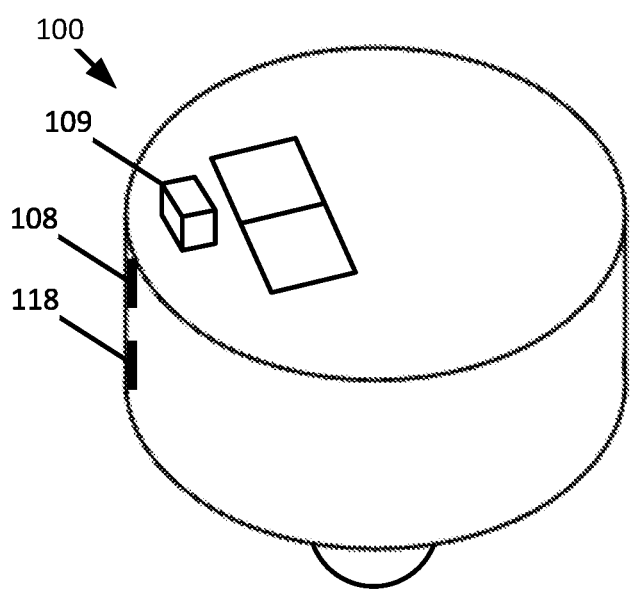

FIG. 3 shows a schematic example of a docking station 300, which may be an example of the beacon 102 of FIG. 1. As shown, the docking station 300 includes a housing 302, a plurality of charging contacts 304 for charging the robotic cleaner 100, a window 306 (e.g., a polycarbonate material transparent to one or more wavelengths of light), and an optical indicium 308 (which may be an example of the optical indicium 113 of FIG. 1). As shown, the housing 302 includes the window 306 and the optical indicium 308 can be disposed at a location behind the window 306 and within the housing 302 such that the optical indicium 308 remains viewable by the camera 108 of the robotic cleaner 100. As such, the window 306 can be configured such that the optical indicium 308 remains visible to the camera 108 of the robotic cleaner 100. In some instances, the window 306 can be transparent to a predetermined range of wavelengths of light (e.g., a range corresponding to infrared light) such that the optical indicium 308 is only visible to the camera 108 and not a user of the robotic cleaner 100. In other words, a substantial portion of light passing through the window 306 corresponds to the predetermined range of wavelengths (e.g., at least 65%, at least 75%, at least 85%, at least 90%, at least 95%, or at least 99% of the light passing through the window 306 corresponds to the predetermined range of wavelengths). In these instances, the robotic cleaner 100 can include the illuminator 118 and the illuminator 118 can be configured to emit the wavelengths of light that the window 306 is transparent to (e.g., infrared light). In order to improve the visibility of the optical indicium 308, the optical indicium 308 may be configured to be at least partially reflective (e.g., at least 20%, at least 30%, at least 40%, at least 50%, at least 60%, at least 70%, at least 80%, at least 90%, or at least 95% of light incident thereon is reflected).

The optical indicium 308 can be used to navigate the robotic cleaner 100 to the docking station 300. For example, the robotic cleaner 100 can be configured to follow and/or move towards a heading that centers the optical indicium 308 within the field of view of the camera 108. As such, the robotic cleaner 100 can advance towards the docking station 300 in a manner that allows the robotic cleaner 100 to engage the charging contacts 304. Such a configuration may result in the robotic cleaner 100 following a more efficient path to the docking station 300 when compared to, for example, a docking station emitting an infrared signal for navigating the robotic cleaner 100 to the docking station.

In some instances, the optical indicium 308 can be used to indicate a docking station type such that the robotic cleaner 100 can engage in a docking action consistent with the docking station type corresponding to the docking station 300. For example, when the docking station 300 is configured to evacuate debris from a dust cup of the robotic cleaner 100, the robotic cleaner 100 can be configured to back into the docking station 300. As such, upon capturing an image of the optical indicium 308 and determining that the docking station 300 is configured to evacuate debris from the dust cup, the robotic cleaner 100 can approach the docking station 300 in a manner that allows the robotic cleaner 100 to back into engagement with the docking station 300.

In some instances, when docked such that the robotic cleaner 100 can observe the optical indicium 308, the robotic cleaner 100 can verify the alignment and/or functionality of the camera 108. To verify the functionality of the camera 108, the robotic cleaner 100 can compare a known image of the optical indicium 308 with a current image of the optical indicium 308 captured by the camera 108 (e.g., when the robotic cleaner 100 engages the docking station 300). For example, over time, the camera 108 may become damaged (e.g., one or more scratches on a lens or protective covering) and/or obscured (e.g., by dust accumulating on the camera 108), resulting in the development of aberrations in captured images. In some instances, the robotic cleaner 100 may be configured to compensate for aberrations.

To verify alignment of the camera 108 when, for example, the camera 108 is a stereo camera, the camera 108 may capture a plurality of images, one for each imager of the stereo camera. Based, at least in part, on the separation distance of the camera 108 from the docking station 300, which is known when the robotic cleaner 100 is engaging the docking station 300, and the geometry of the camera 108 (e.g., a separation distance between imagers, lens shape, and/or the like) the robotic cleaner 100 can estimate a location of the optical indicium 308 in each of the captured images and compare the estimated location to the actual location. If, based on the comparison, the estimated location is sufficiently different from the actual location, the robotic cleaner 100 may apply a software compensation to the captured images such that the difference is within a predetermined range (e.g., minimized).

In some instances, the optical indicium 308 can be used to indicate a location of the docking station 300. For example, the optical indicium 308 may be used to identify which portion of a building (e.g., which floor or room in a home) the docking station 300 is located in such that the robotic cleaner 100 can select a map corresponding to that portion.

The docking station 300 may also include one or more homing signal generators 310. The homing signal generator 310 can be configured to generate a signal that at least partially covers a region extending around the docking station 300 such that the robotic cleaner 100 can determine its proximity to the docking station 300 (e.g., using the homing signal detector 109). For example, in some instances, the robotic cleaner 100 can be configured to determine an intensity of the emitted homing signal and move in a direction that increases the detected intensity. As such, as the intensity of the homing signal increases, the robotic cleaner 100 can determine that it is approaching the docking station 300 and begin attempting to capture an image of the optical indicium 308. In some instances, the robotic cleaner 100 may not be configured to determine an intensity of the homing signal. In these instances, the homing signal may be used to determine that the robotic cleaner 100 is within viewing distance of the optical indicium 308. The homing signal generator 310 may be an infrared (IR) emitter, an ultrasonic emitter, a radio frequency generator, and/or any other signal generator configured to emit one or more signals into an environment of the docking station 300.

Figure 4:
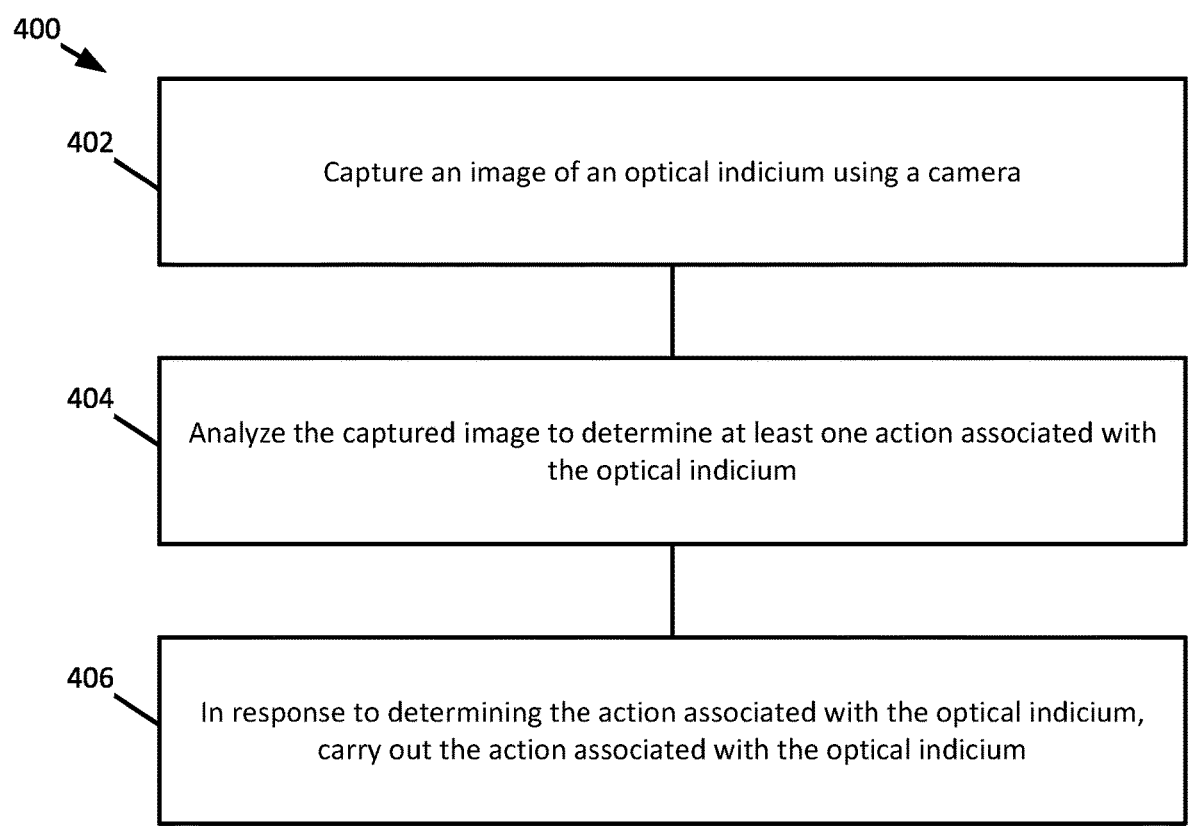
FIG. 4 is a flow chart of an example of a method of communicating with a robotic cleaner using an optical indicium, consistent with embodiments of the present disclosure.

FIG. 4 shows a flow diagram of an example method 400 of operation of a robotic cleaner, such as the robotic cleaner 100 of FIG. 1, when observing an optical indicium, such as the optical indicium 113 of FIG. 1. As shown, the method 400 may include a step 402. The step 402 may include the robotic cleaner observing the optical indicium with a camera (e.g., capturing an image of the optical indicium).

The method 400 may also include a step 404. The step 404 may include analyzing an image of the optical indicium (e.g., coupled a beacon). Upon detecting the optical indicium, the robotic cleaner is configured to determine an action associated with the optical indicium. For example, the robotic cleaner can be configured to compare the captured image of the optical indicium with known images of one or more optical indicia stored in a memory of the robotic cleaner.

The method 400 may also include a step 406. The step 406 may include causing the robotic cleaner to carry out an action associated with the optical indicium. For example, when the robotic cleaner determines that the optical indicium captured in the images matches a known image of an optical indicium (e.g., the robotic cleaner identifies a sufficient number of similarities between the known image and the captured image), the robotic cleaner can be configured to carry out an action associated with the known image. If a match is not determined to exist, the robotic cleaner can be caused to carry out an action that results in the robotic cleaner associating an action with the optical indicium captured in the image.

Figure 5:
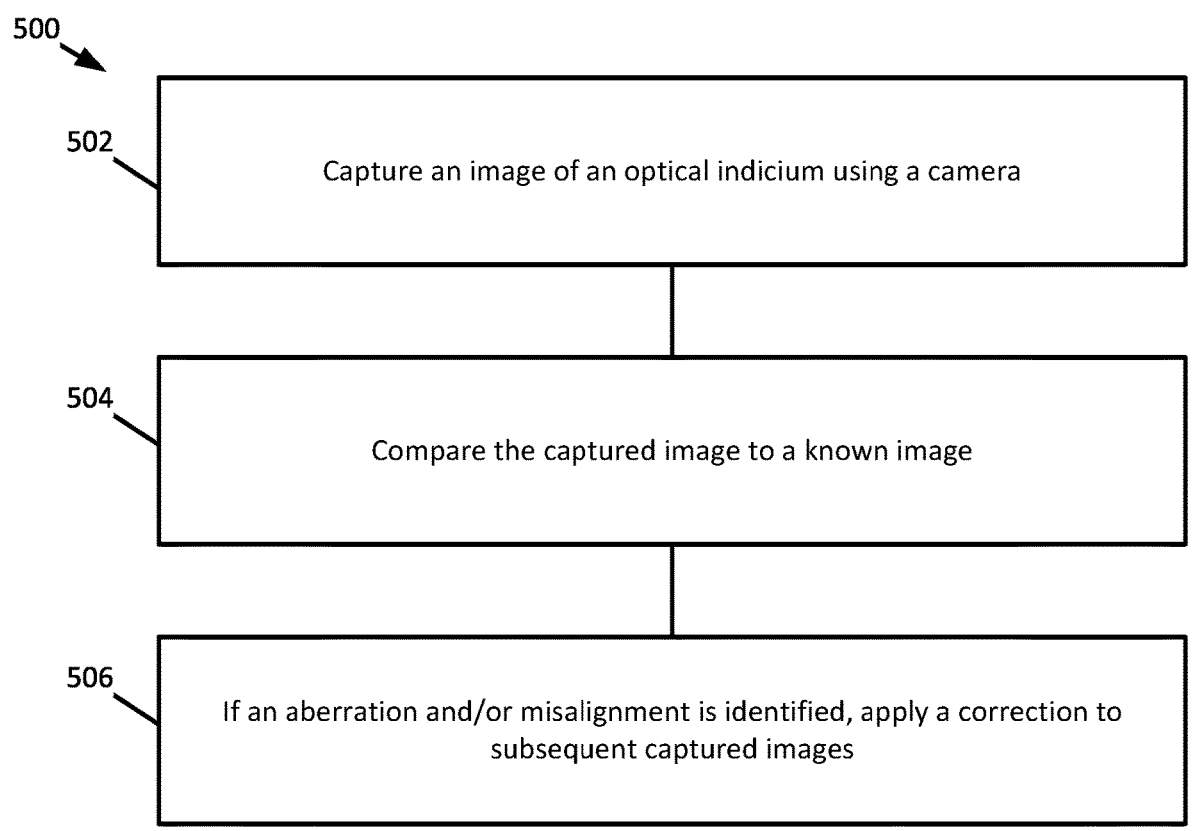
FIG. 5 is a flow chart of an example of a method of correcting for an aberration in an image captured by and/or a misalignment of a camera, consistent with embodiments of the present disclosure.

FIG. 5 shows a flow diagram of an example of a method 500 for verifying a function of and/or an alignment of a camera, such as the camera 108 of FIG. 1, for a robotic cleaner, such as the robotic cleaner 100 of FIG. 1. As shown, the method 500 may include a step 502. The step 502 may include capturing an image of an optical indicium at a known separation distance from the optical indicium. For example, when the robotic cleaner is engaging a docking station to recharge one or more batteries powering the robotic cleaner, the robotic cleaner is at a known distance from an optical indicium coupled to the docking station.

The method 500 may also include a step 504. The step 504 may include comparing the captured image of the optical indicium to a known image of the optical indicium. The comparison may identify aberrations in the captured image that correspond to occlusions (e.g., a dust accumulation on the camera) and/or damage of the camera. The robotic cleaner may also determine whether the camera is misaligned based on the comparison. For example, the robotic cleaner may determine an estimated location of the optical indicium and, if the location of the optical indicium in the captured image does not correspond to the estimated location, the robotic cleaner may determine there is a misalignment.

The method 500 may also include a step 506. The step 506 may include causing the robotic cleaner to apply a correction to subsequent captured images to correct for any identified aberrations and/or misalignments. If the misalignment and/or aberrations cannot be corrected by the robotic cleaner, the robotic cleaner may be configured to notify a user of the robotic cleaner.

One or more of the methods 400 and/or 500 can be embodied as instructions in at least one non-transitory computer readable medium such that, when the instructions are executed by one or more processors, one or more of the methods 400 and/or 500 can be caused to be carried out. In some instances, one or more of the methods 400 and/or 500 can be embodied in circuitry (e.g., an application specific integrated circuit). As such, one or more of the methods 400 and/or 500 can be carried out using any combination of software, firmware, and/or hardware.

An example of a docking station for a robotic cleaner, consistent with the present disclosure, may include a housing having a window and an optical indicium having an optical pattern. The optical indicium may be disposed within the housing and be viewable by a camera of the robotic cleaner through the window. After observing the optical indicium, the robotic cleaner may be caused to carry out an action associated with at least a portion of the optical pattern.

In some instances, the action may include causing the robotic cleaner to load a map corresponding to a location in which the docking station is disposed. In some instances, the window may be configured such that a substantial portion of light passing therethrough corresponds to a predetermined range of wavelengths. In some instances, the predetermined range of wavelengths may correspond to infrared light. In some instances, the optical pattern may include an identifying portion and an action portion. In some instances, the identifying portion may identify an action type corresponding to a respective action portion. In some instances, in response to identifying the action type corresponding to the action portion, the robotic cleaner may be caused to identify the action corresponding to the action portion and to carry out the action. In some instances, the optical pattern may include at least a first, second, and third action portion, the first action portion corresponding to a cleaning action, the second action portion corresponding to a navigation action, and the third action portion corresponding to a map loading action.

An example of a beacon for a robotic cleaner, consistent with the present disclosure, may include a housing and an optical indicium having an optical pattern. The optical indicium may be coupled to the housing and be viewable by a camera of the robotic cleaner. After observing the optical indicium, the robotic cleaner may be caused to carry out an action associated with at least a portion of the optical pattern.

In some instances, the action may include causing the robotic cleaner to load a map corresponding to a location in which the beacon is disposed. In some instances, the housing may include a window and the optical indicium may be disposed behind the window, the window being configured such that a substantial portion of light passing therethrough corresponds to a predetermined range of wavelengths. In some instances, the predetermined range of wavelengths may correspond to infrared light. In some instances, the optical pattern may include an identifying portion and an action portion. In some instances, the identifying portion may identify an action type corresponding to a respective action portion. In some instances, in response to identifying the action type corresponding to the action portion, the robotic cleaner may be caused to identify the action corresponding to the action portion and to carry out the action. In some instances, the optical pattern may include at least a first, second, and third action portion, the first action portion corresponding to a cleaning action, the second action portion corresponding to a navigation action, and the third action portion corresponding to a map loading action.

An example of a system, consistent with the present disclosure, may include a robotic cleaner and a beacon. The robotic cleaner may include a processor configured to cause the robotic cleaner to carry out one or more instructions stored in a memory and a camera configured to observe an environment of the robotic cleaner. The beacon may include a housing and an optical indicium having an optical pattern. The optical indicium may be coupled to the housing and be viewable by the camera of the robotic cleaner. The robotic cleaner may be configured to carry out an action associated with at least a portion of the optical pattern in response to observing the optical indicium.

In some instances, the action may include causing the robotic cleaner to load a map corresponding to a location in which the beacon is disposed. In some instances, the housing may include a window and the optical indicium is disposed behind the window, the window being configured such that a substantial portion of light passing therethrough corresponds to a predetermined range of wavelengths. In some instances, the predetermined range of wavelengths may correspond to infrared light. In some instances, the optical pattern may include an identifying portion and at least one action portion. In some instances, the identifying portion may identify an action type corresponding to a respective action portion. In some instances, the robotic cleaner may be configured to carry out at least one of load a map, perform a cleaning action, or perform a navigation action in response to observing the action portion. In some instances, the optical pattern may include at least three action portions such that the robotic cleaner carries out the cleaning action and the navigation action, each being associated with the map caused to be loaded. In some instances, the robotic cleaner may further include an illuminator configured to emit light. In some instances, the optical indicium may be at least partially reflective such that at least a portion of the emitted light is reflected from the optical indicium. In some instances, the beacon may be a docking station having a plurality of charging contacts. In some instances, the robotic cleaner may be configured to verify a functionality of the camera while engaging the docking station. In some instances, the robotic cleaner may verify the functionality of the camera by comparing a known image of the optical indicium to an image of the optical indicium captured by the camera after the robotic cleaner engaged the docking station. In some instances, the robotic cleaner may be configured to verify an alignment of the camera while engaging the docking station. In some instances, the camera may be a stereo camera. In some instances, the beacon may further include a homing signal generator configured to generate a homing signal. In some instances, the robotic cleaner may further include a homing signal detector configured to detect the homing signal. In some instances, the robotic cleaner may be guided to the beacon based, at least in part, on the homing signal.

An example of a robotic cleaner, consistent with the present disclosure, may include at least one driven wheel configured to urge the robotic cleaner across a surface to be cleaned, a camera configured to observe an environment of the robotic cleaner, and at least one processor configured execute one or more instructions stored in at least one memory. Upon executing the one or more instructions the processor may cause the robotic cleaner to carry out operations that may include capturing an image of an optical indicium having an optical pattern using the camera, analyzing the image to determine at least one action associated with at least a portion of the optical pattern, and causing the robotic cleaner to carry out the determined action.

Another example of a robotic cleaner, consistent with the present disclosure, may include at least one driven wheel configured to urge the robotic cleaner across a surface to be cleaned, a camera configured to observe an environment of the robotic cleaner, and at least one processor configured execute one or more instructions stored in at least one memory. Upon executing the one or more instructions the processor may cause the robotic cleaner to carry out operations that may include capturing an image of an optical indicium having an optical pattern using the camera, comparing the captured image to a known image to determine whether the camera is misaligned or whether the captured image includes an aberration, and in response to determining that the camera is misaligned or an aberration is present, applying a correction factor to subsequent images to account for the misalignment or the aberration.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A docking station for a robotic cleaner comprising:
a housing having a window; and
an optical indicium having an optical pattern, the optical indicium being at least partially reflective to infrared light, being disposed within the housing, and being viewable by a camera of the robotic cleaner through the window, after observing the optical indicium, the robotic cleaner is caused to carry out an action associated with at least a portion of the optical pattern, wherein the window is configured such that a substantial portion of light passing therethrough corresponds to a predetermined range of wavelengths, the predetermined range of wavelengths corresponding to infrared light, wherein the optical pattern includes at least a first, second, and third action portion, the first action portion corresponding to a cleaning action, the second action portion corresponding to a navigation action, and the third action portion corresponding to a map loading action.

2. The docking station of claim 1, wherein the optical pattern includes an identifying portion and an action portion.

3. The docking station of claim 2, wherein the identifying portion identifies an action type corresponding to a respective action portion.

4. A beacon for a robotic cleaner comprising:

a housing; and an optical indicium having an optical pattern, the optical indicium being at least partially reflective to infrared light, being coupled to the housing, and being viewable by a camera of the robotic cleaner, after observing the optical indicium, the robotic cleaner is caused to carry out an action associated with at least a portion of the optical pattern, wherein the housing includes a window and the optical indicium is disposed behind the window, the window being configured such that a substantial portion of light passing therethrough corresponds to a predetermined range of wavelengths, the predetermined range of wavelengths corresponding to infrared light wherein the optical pattern includes at least a first, second, and third action portion, the first action portion corresponding to a cleaning action, the second action portion corresponding to a navigation action, and the third action portion corresponding to a map loading action.

5. The beacon of claim 4, wherein the optical pattern includes an identifying portion and an action portion.

6. The beacon of claim 5, wherein the identifying portion identifies an action type corresponding to a respective action portion.

7. A system comprising:
a robotic cleaner, the robotic cleaner including:
   a processor configured to cause the robotic cleaner to carry out one or more instructions stored in a memory; and
   a camera configured to observe an environment of the robotic cleaner; and a beacon, the beacon including:
a housing; and
   an optical indicium having an optical pattern, the optical indicium being coupled to the housing and being viewable by the camera of the robotic cleaner, the robotic cleaner being configured to carry out an action associated with at least a portion of the optical pattern in response to observing the optical indicium, wherein the optical pattern includes at least a first, second, and third action portion, the first action portion corresponding to a cleaning action, the second action portion corresponding to a navigation action, and the third action portion corresponding to a map loading action.

8. The system of claim 7, wherein the action includes causing the robotic cleaner to load a map corresponding to a location in which the beacon is disposed.

9. The system of claim 7, wherein the optical pattern includes an identifying portion and an action portion.

10. The system of claim 9, wherein the identifying portion identifies an action type corresponding to a respective action portion.

11. The system of claim 10, wherein, in response to identifying the action type corresponding to the action portion, the robotic cleaner is caused to identify the action corresponding to the action portion and to carry out the action.

* * * * *